United States Patent Office 3,826,763
Patented July 30, 1974

3,826,763
SUPER-STIFF POLYURETHANE FOAM
Roland J. Lamplugh, Aston, and Rocco P. Triolo, Broomall, Pa., assignors to Scott Paper Company
No Drawing. Continuation-in-part of application Ser. No. 53,328, July 8, 1970, which is a continuation-in-part of application Ser. No. 701,035, Jan. 8, 1968, both now abandoned. This application Sept. 1, 1972, Ser. No. 285,953
Int. Cl. C08g 22/44
U.S. Cl. 260—2.5 AM
12 Claims

ABSTRACT OF THE DISCLOSURE

Flexible polyurethane foams having high load-bearing properties and improved tensile and tear strength are produced from a foamable polyurethane-forming reaction mixture comprising a high load-bearing imparting amount of a load-bearing agent which is a compound having one primary amino group bonded directly to an aromatic ring carbon atom, such as a compound having the formula $$YANH_2 \qquad (I)$$

where A is phenylene, naphthalene, anthracene or phenanthrene; Y is the radical—$R_n$ where $n$ is zero or an integer of from 1 to 5 and R is selected from the group consisting of hydrogen, $C_1$–$C_8$ alkyl, phenyl, halogen, hydroxy, mercapto, nitro, carboxy, $C_1$–$C_8$ alkoxy, phenylalkyl wherein the alkyl portion contains from 1 to 3 carbon atoms, $C_1$–$C_3$ haloalkyl, $C_1$–$C_3$ hydroxyalkyl, $C_1$–$C_3$ mercaptoalkyl, $C_1$–$C_3$ nitroalkyl, and carboxyalkyl wherein the alkyl portion contains from 1 to 3 carbon atoms; provided that when R is hydroxy, alkoxy, or alkyl and is ortho to the amino group, then no other hydroxy, alkoxy or alkyl group may be ortho- or para- to said amino group.

DISCUSSION

This is a continuation-in-part of our earlier filed copending application Ser. No. 53,328, filed July 8, 1970, now abandoned, and which, in turn, is a continuation-in-part of our earlier filed copending application Ser. No. 701,035, filed Jan. 8, 1968, and now abandoned. This invention relates to low density polyurethane foams having high load-bearing ability with low to moderate recovery rate and/or improved tensile and tear strength and a process for making polyurethane foam which is capable of offering a substantial resistance to compressive forces in comparison to known polyurethane flexible foams, and is capable of completely recovering its original shape at a low to moderate rate, and to polyurethane foams having improved tensile and tear strengths.

Polyurethane foams are conventionally produced by the reaction of a polyisocyanate and a polyhydroxy-containing compound, in the presence of a suitable gaseous blowing agent. The resulting polyurethane foams broadly fall into the three categories of flexible, semi-rigid and rigid polyurethane foams. The categorization of a particular polyurethane foam into one of the three foregoing groups is generally made according to the compressive strength of the foam, flexible foams having low compressive strength and rigid foams having the highest compressive strengths.

It is desirable to be able to produce a flexible polyurethane foam which has substantially high compressive strength, that is to say which is not readily compressed upon application of a compressive force, and which concomitantly has a good ability to completely recover its original configuration at a low to moderate rate and to retain its original compressive strength upon the release of any applied compressive force. Polyurethane foams having good compressive strength and ability to recover their original configuration slowly are particularly useful for shock absorbing applications, such as for crash helmet padding, protective packaging such as for missile packages, for the packaging of fragile articles generally, and in automobile and other vehicle padding such as in door panels and padded dashboards. Currently no commercially attractive flexible polyurethane foam is available which combines the desired properties of high compressive strength, and good ability to retain compressive strength and resume original shape at a low to moderate rate upon release of an applied compressive force. The rigid polyurethane foams have excellent compressive strength, and would be useful for the foregoing shock-absorbing applications, were it not for the fact that the rigid foams are readily collapsed, and cannot generally resume their original configurations or retain their original compressive strengths, after a substantial initial force has been applied thereto.

The semi-rigid polyurethane foams also have good compressive strengths, and are also able to recover their original configuration and strength at a moderate rate after an applied compressive force is released. However, the semi-rigid foams must be rather dense in order to obtain these properties. A semi-rigid foam having acceptable load-bearing and recovery properties must be at least 5 pounds per cubic foot in density, and generally a density of 8 to 10 pounds per cubic foot would be required to obtain good load-bearing and recovering properties. Foams of these densities are rather expensive since the large amounts of material required for such dense foam constitute the major cost of making the foam. Also, for packaging applications, the substantial weight of these dense foams makes them expensive to ship and therefore less attractive as a protective packaging material.

In contrast the flexible polyurethane foams have relatively low compressive strengths and recover their original shape rapidly after application of compressive forces. For these reasons the flexible foams are not generally acceptable for use in high load-bearing applications, such as many protective packaging uses. The flexible foams do have the advantage, though, of being able to be produced at low densities such as on the order of 4 pounds or less per cubic foot, and are consequently substantially less expensive to produce than the more dense semi-rigid foams. Part of these physical shortcomings can be overcome by increasing the density of the flexible foams substantially and thereby increasing the load-bearing ability, but such increased density would also substantially increase cost.

It is to be noted that a relatively low recovery rate is desirable when foams are used for force absorbing purposes, such as padded dashboards, crash helmet padding and shock-absorbent protective packaging, so that the forces applied to the foam can be dissipated and not reapplied to the object which transmitted the force to the foam. By recovery rate is herein meant the time which is required for the foam to substantially completely resume its original configuration after a force is applied and released. If recovery ability is measured by percent rebound an ordinary two pound per cubic foot flexible polyurethane foam will have a percent rebound of about 40% to 50%. For high load-bearing purposes a percent rebound of about 25% or less is desirable. When a high load-bearing foam is used as a rug backing material, moderate, rather than low, recovery of original configuration is desired and a percent rebound of about 30% to 35% is preferred for such applications.

The instant invention overcomes the foregoing disadvantages of the prior art by providing a low density product which can be made without substantially departing from conventional flexible polyurethane foam formulations except in the manner hereinafter described. The foams of this invention combine properties of compressive strength which are not found in the ordinary low density flexible foam formulations, and low to moderate recovery from applied forces such as are present in the dense semi-rigid foams. In addition to having improved load-bearing properties, the polyurethane foams produced in accordance with this invention may also have higher tensile and tear strengths than foams produced by the use of substantially similar formulations without the use of the high load-bearing imparting agent, and may have greater solvent swell resistance than foams produced from such otherwise similar formulations. This latter characteristic is important because solvent swell causes substantial weakening of the foam, resulting in lower tensile and tear strengths.

SUMMARY OF THE INVENTION

In accordance with this invention, a flexible, low density, high load-bearing polyurethane foam is produced by incorporating in the foamable polyurethane-forming reaction mixture a high load-bearing agent which is a compound having one primary amino group bonded directly to an aromatic ring carbon atom. Such load-bearing agent has the following generic formula:

$$YANH_2 \quad (I)$$

where A is phenylene, naphthalene, anthracene or phenanthrene; Y is the radical $—R_n$ where $n$ is zero or an integer of from 1 to 5 and R is selected from the group consisting of hydrogen, $C_1-C_8$ alkyl, phenyl, halogen, hydroxy, mercapto, nitro, carboxy, $C_1-C_8$ alkoxy, phenylalkyl wherein the alkyl portion contains from 1 to 3 carbon atoms, $C_1-C_3$ haloalkyl, $C_1-C_3$ hydroxyalkyl, $C_1-C_3$ mercaptoalkyl, $C_1-C_3$ nitroalkyl, and carboxyalkyl wherein the alkyl portion contains from 1 to 3 carbon atoms; provided that when R is hydroxy, alkoxy or alkyl and is ortho- to the amino group, then no other hydroxy, alkoxy or alkyl group may be ortho- or para- to said amino group.

The preferred load-bearing agents of this invention may be represented by the following formula:

(II)

wherein R is as hereinbefore defined and $n'$ is zero or an integer of from 1 to 3. The group or groups represented by R and the location of these substituents on the benzene ring should be such that they have little or no effect on the activity of the amino group present (i.e. the group or groups should neither strongly activate nor strongly deactivate the amino substituent on the benzene ring), nor should the substituent(s) sterically hinder the amino substituent on the benzene ring. The R substituents should also be such that they do not render the load-bearing agent incompatible with the foam formulation in which it is to be employed (e.g. by rendering the compound insoluble in said formulation, by resulting in a compound which is thermally unstable at the temperatures encountered during the foaming reaction and/or curing, or by resulting in a compound which readily enters into undesirable side reactions which are deleterious to the formation of an acceptable foam). The load-bearing agent of this invention is present in the amount of from about 0.01 to about 0.20 moles, based on 100 parts by weight of polyol; the preferred amount of such load-bearing agent is from about 0.05 to 0.15 moles, based on 100 parts by weight of polyol.

Representative compounds which are useful as load-bearing agents in this invention are aniline, o-chloroaniline, m-chloroaniline, p-chloroaniline, o-toluidine, p-toluidine, m-toluidine, 3-chloro-2-methylaniline, 5-chloro-2-methylaniline, 2-chloro - 3 - methylaniline, 2-chloro-5-methylaniline, α-naphthylamine, β-naphthylamine, 2,5-dichloroaniline, 3,4-dichloroaniline, o-ethylaniline, m-ethylaniline, p-ethylaniline, o-nitroaniline, m-nitroaniline, p-nitroaniline, m-(trifluoromethyl)aniline, o-(trifluoromethyl)aniline, p-(trifluoromethyl)aniline, m-aminophenol, o-aminophenol, p-aminophenol, m-aminobenzoic acid, o-aminobenzoic acid, p-aminobenzoic acid, 4-aminosalicylic acid, p-aminophenol, o-aminothiophenol, o-aminobenzonitrile, o-aminobenzyl alcohol, p-aminophenylacetic acid, and ortho-anisidine m-anisidine, p-anisidine. Keeping in mind the basic limitations set forth above, useful load-bearing agents are also found among aminobenzylesters, aminobenzylaldehydes, aminobenzylketones, aminobenzylethers, and the like.

In producing foams in accordance with this invention, the polyhydroxy-containing compound may be thoroughly mixed with the high load-bearing imparting agent, and the remaining additives, except the polyisocyanate, then inititmately blended therein. The polyisocyanate would then be added to the blend, thoroughly mixed therewith and deposited on a suitable surface or in a suitable foaming container. In a production process, the reactants could be mixed in the mixing head of a continuous, slab-stock polyurethane-producing machine, and the mixed reactants would be deposited upon a continuously moving conveyor release surface having side walls to restrain marginal flow of the reactants.

The process of this invention enables the manufacture of a product which is particularly notable for its increased load-bearing ability in relation to the relatively low density of the foam product. In attempting to produce flexible polyurethane foams which might have shock-absorbing utilities, load-bearing ability can be developed by increasing the density of the foam product; it should be noted parenthetically, however, that with flexible foams this increased density will usually produce an accompanying increased rebound characteristic as well as the increased load-bearing ability. However, foams produced in accordance with the process of this invention, in addition to the noted decreased rebound characteristics, produce foams having substantially higher load-bearing properties at lower densities than available using prior art processes and foams.

For example, a semi-rigid foam would have to have a density of 8 to 10 pounds per cubic foot to have load-bearing and rebound characteristics comparable to a foam produced pursuant to this invention. It should be noted that the polyols used for making semi-rigid foams are generally more expensive than the polyols used in making flexible foams, which latter polyols may be used in the process of this invention. For these reasons a foam produced in accordance with this invention might readily cost one-half or one-third of the cost of a semi-rigid foam of comparable load-bearing and recovery characteristics. Of course, specific cost relationships can vary substantially depending on manufacturing costs, surfactant levels utilized and the like.

Foams produced in accordance with the process of this invention may also have substantially increased tensile and tear strengths, when compared with substantially identical foam formulations which do not contain the high load-bearing imparting agents of this invention. These improved properties are, of course, highly significant and desirable, particularly when considering the polyether-type polyurethane foams which have substantially lower tensile and tear strengths than the polyester-type foams. These improved properties are of major importance in evaluating the utility of foams produced according to this invention for packaging purposes, enabling the foams of this invention to have longer life and/or be capable of use under more severe conditions.

The foams produced according to this invention may have the concomitant desirable characteristics of having improved swell resistance when exposed to common organic solvents. Most flexible polyurethane foams, when subjected to intimate contact with organic solvents will swell considerably. This phenomenon is more marked in connection with the polyether-type polyurethane foams than with the polyesters. Solvent swell is an undesirable phenomenon when the foams are being used for chemical process applications, such as in filter beds. Therefore, the foams produced in accordance with this invention are particularly useful for such chemical process applications as separators for catalyst beds and as gross filters. In all of these applications, which involve the exposure of the foam to chemical action, it is preferred to be able to use the polyether-type foams, because of their generally greater chemical resistance as compared with the polyester-type foams. Thus, the improved properties of solvent swell resistance and increased tensile and tear strength available in polyether-type foams produced in accordance with this invention make those foams particularly appealing for such process applications.

In practicing the process of this invention, it is preferred to use aniline or o-chloroaniline as the load-bearing agent. These compounds are the most desirable because of their general commercial availability at relatively low cost, and because they optimize the improved characteristics of high load-bearing, low to moderate recovery rates and increased tensile and tear strengths which are obtained pursuant to the practice of this invention.

When o-chloroaniline is utilized as a high load-bearing imparting agent in a foam formulation pursuant hereto, the foaming reaction is considerably slower than when aniline is used as the monofunctional amine. For commercial purposes it is desirable to control the reaction rate to one which is between the rates obtained with the use of aniline and o-chloroaniline alone and it is therefore highly desirable, although not essential, in the practice of this invention to use a mixture of aniline and o-chloroaniline. It is preferred that these two amines be combined in approximately equal amounts and most preferably about 0.05 moles of each of aniline and o-chloroaniline, based on 100 parts by weight of polyhydroxy-containing compound.

In the conventional production of polyurethane foams, a polyisocyanate is reacted with a polyhydroxy-containing compound in the presence of a gaseous blowing agent. The reaction mixture will often also include a surfactant, to permit the foam upon its initial formation to retain its foamed shape, a catalyst or catalysts to increase the rate of reaction, and can include other suitable additives which may be flame retardants, such as tris-beta chloroethylphosphate, cross-linking agents such as glycol, and plasticizers, coloring agents and anti-oxidants. The polyisocyanate utilized is conventionally an 80:20 mixture of the 2,4- and 2,6-isomers of toluene diisocyanate, although other organic polyisocyanates could be utilized. Conventionally, the polyhydroxy-containing compound is a polyester or a polyether. With respect to the polyethers, suitable polyethers utilized in the production of flexible polyurethane foams are the polyalkylene oxide ethers, such as the reaction products of ethylene oxide, propylene oxide, butylene oxide, hexadecylene oxide, styrene oxide, picoline oxide or methyl glycide, with a compound containing two or more reactive hydrogens, such as glycols like ethylene glycol, diethylene glycol, triethylene glycol and the like, or triols like glycerol, or trimethylolpropane, pentaerythritol or resorcinol.

The most preferred polyethers are polypropylene oxide adducts, such as polypropylene oxide adducts of glycerol. If polyalkylene ether glycols are used pursuant to this invention, compounds having molecular weights in the range from about 500 to about 3500 will produce low density polyurethane foams and will be usable in accordance with this invention.

If a polyester polyol-type polyurethane is to be produced, polyesters useful in producing such foams can be prepared, for example, by conventional methods of condensation polymerization from polyols and dicarboxylic acids. For use in manufacturing low density foams, a polyester glycol may be prepared from a diol, such as diethylene glycol and a dicarboxylic acid, such as adipic acid.

A relatively small amount of a triol, such as trimethylol propane, could be included to enable cross-linking.

The blowing agent utilized to produce the foam in the polyurethane-forming reaction is conventionally produced by the reaction between polyisocyanate and water, which generates $CO_2$ as the blowing agent. Other blowing agents may be fluorocarbons having low boiling points, which are added to the polyurethane-forming reactants and which are volatilzed by the exotherm of the polyurethane-forming reaction. Suitable low boiling agents are trichlorofluoromethane and methylene chloride. Suitable surfactants are the organo-silicones, which will ordinarily be present in an amount from about 0.5% to 1.5% by weight, based on the weight of the polyhydroxy-containing compound. Catalysts which are ordinarily utilized to accelerate the polyurethane-forming reaction are the organometallic compounds, such as dibutylin dilaurate and stannous octoate, or the tertiary amines, such as N-ethylmorpholine, triethylamine, triethylene diamine and dimethyl cyclohexylamine.

In the manufacture of polyurethane foam, a very wide range of foam formulation variations are conventionally utilized in order to obtain varying types of foam characteristics. For example, pore size, softness, tensile strength, tear strength, load-bearing abolity, percent rebound, density and solvent swell resistance are characteristics which are desired to be incorporated into foam in varying degrees. The particular combination of these characteristics to be obtained will often depend on the end uses for which the foam is to be applied. These varying characteristics can be obtained by varying surfactant levels, catalyst levels, water levels and index, inter alia, considering any particular resin, either ether or ester, which is used for the formation of a polyurethane foam.

In practicing the invention, as mentioned hereinabove, it is preferred that the high load-bearing imparting agent be present in an amount in the range from about .05 to about .15 moles per 100 parts by weight of polyol; the most preferred amount of load-bearing agent ranges from .075 to .125 moles per 100 parts by weight of polyol. Suitable polyisocyanates can be used in the index range from about 95 to about 140, the higher indexes being preferred if moderate (contrasted to low) recovery rate is a desired feature of the foam, such as when it is used as rug underlay. The term index, as used in the polyurethane foam art, is the ratio of the actual amount of polyisocyanate in the reaction mixture to the theoretical amount of polyisocyanate needed for reaction with all active hydrogen compounds present in the reaction mixture, multiplied by 100. As a general principle in the production of flexible polyurethane foams, indexes in excess of about 105 are to be avoided, although the exact optimum index depends upon the particular resin used in the formulation because high index will generally result in substantial shrinkage of the foam, thereby resulting in a commercially unusable product. In accordance with the practice of the instant invention, indexes as high as 140 can readily be utilized without effecting any substantial shrinkage of the foam, because of the cell-opening effect of the designated amines. It is desirable to be able to use high indexes in the manufacture of foams, since this is a good technique for further increasing the load-bearing ability of a particular foam, and to improve the recovery rate of foams used as rug-backing materials.

In the production of the polyurethane foams of this invention a polyisocyanate, such as the 80:20 mixture of 2,4- and 2,6-toluene diisocyanate isomers, is reacted with polyhydroxy-containing compounds, preferably polypropylene oxide adducts of glycerol having molecular weights in the range from about 500 to about 3500, in the presence of a high load-bearing imparting agent of this invention, preferably aniline or o-chloroaniline, present in an amount in the range from about .01 to about 0.2 moles based on 100 parts of the resin, but most preferably approximately .075 to .15 moles of primary aromatic amine. It will often be desired, in accordance with this invention, to combine two or more suitable primary aromatic amines to produce particular desired results such as to control the rate of reaction. Therefore, it is a preferred embodiment of the invention to combine primary aromatic amines, such as aniline and o-chloroaniline; when this is done equal amounts of aniline and o-chloroaniline of about 0.05 moles per 100 parts of resin are most preferred.

EXAMPLES

To assist those skilled in the art to practice the present invention, the following examples are suggested by way of illustration, parts and percentages being by weight unless otherwise specifically noted.

In the examples, the procedure for producing the polyurethane foams utilized was as follows. The polyhydroxy-containing compound and high load-bearing imparting agent were placed in a first container and intimately mixed. All of the other additives involved in the foam formulation, except the polyisocyanate, were added to this vessel and intimately mixed. The polyisocyanate was then added to this vessel and intimately mixed. The polyisocyanate was then added to the mixture with thorough mixing and this reaction mixture was quickly poured into a suitable cardboard container and allowed to rise and set. In a commercial production process, all ingredients might preferably be combined in the mixing head of a continuous slab stock polyurethane machine.

With respect to the following examples, the polyester resin utilized was Fomrez 50, a glycol-adipate type polyester polyol, which is available from the Witco Chemical Company. With respect to the polyethers utilized in the examples, all are propylene oxide adducts of glycerol. LHT-112 is a 1500 molecular weight polyether available from the Union Carbide Corporation. Poly-G SF1000 is a 1000 molecular weight polyether polyol of the Olin Corporation, and Fomrez ET3000 is a 3000 molecular weight polyether polyol of the Witco Chemical Company.

The polyisocyanate used in the reaction mixtures is "Hylene TM," and 80:20 mixture of the 2,4- and 2,6-isomers of toluene diisocyanate.

The L-520 and L-540 surfactants utilized in the examples are polyoxyalkylene-siloxane copolymers sold by the Union Carbide Corporation.

The expression "C-6" represents a solution containing one part by weight stannous octoate and two parts by weight dioctylphthalate vended by Witco Chemical Company.

The test used to determine load deflection as set forth in the examples is ASTM Test D-1564 which is a recognized ASTM test (suffix D) for testing flexible polyurethane foam. In the performance of the test in some instances initial and at rest readings were taken.

The percent rebound data presented in the Examples are based upon the performance of the ASTM tests for polyurethane foam, D-1564 (suffix R) and the numbers in the Examples relate the percent of the release height of a specified steel ball which the ball reaches when dropped onto the designated foam sample. Percent rebound is usually used as a measure of the rate at which a foam recovers from applied forces.

TABLE I

Significance.—All of the foam compositions in Table I (Examples 1-5) are based on a 1000 molecular weight polyether ((Poly-G SF1000). The control contains no aniline whereas the other examples contain from 9.3 to 14.0 phr. aniline at varying water levels and indices. All of the compositions containing aniline exhibit substantially higher load deflection values and tensile strengths than does the control.

It must also be noted that in order to provide a stable non-shrinking control (Example 1), it was necessary to use "Hylene TM 65" which is a 65:35 mixture of 2,4- and 2,6-toluene diisocyanate isomers; "Hylene TM" (described hereinabove) was used in Examples 2-5. The isomer ratio of 65:35 is known to have a greater cell-opening tendency than an 80:20 mixture of 2,4- and 2,6-toluene diisocyanate isomers. The use of aniline provided stable, non-shrinking foam compositions without having to use the 65:35 blend demonstrating its cell-opening ability.

| | Example | | | | |
|---|---|---|---|---|---|
| | *1 | 2 | 3 | 4 | 5 |
| Resin, 1,000 M.W. polyether (Poly-G SF 1,000) | 100 | 100 | 100 | 100 | 100 |
| Surfactant (L-520) | 1.5 | 1.5 | 1.5 | 1.5 | 1.5 |
| Stannous octoate | | .05 | .15 | .075 | .075 |
| Triethylenediamine | 0.45 | | | | |
| Aniline | | 9.3 | 14.0 | 14.0 | 12.0 |
| Water | 2.0 | 2.0 | 2.0 | 2.0 | 3.0 |
| Toluene diisocyanate | 45.5 | 57.0 | 59.0 | 73.0 | 78.4 |
| Index | 105 | 105 | 105 | 120 | 120 |
| Density (pounds per cubic foot) | 2.9 | 2.9 | 3.8 | 3.9 | 2.1 |
| Tensile (p.s.i.) | 24.3 | 27.7 | 37.2 | 55.0 | 45.5 |
| Tear (pounds per linear inch) | 3.0 | 3.2 | 3.9 | 4.4 | 3.1 |
| Load deflection (p.s.i.) | | | | | |
| 25% Initial | 0.51 | 1.35 | 1.9 | 9.3 | 2.7 |
| Rest | 0.39 | .73 | .97 | 3.0 | 1.3 |
| 50% Initial | 0.62 | 1.69 | 2.4 | 11.4 | 3.6 |
| Rest | 0.49 | 1.01 | 1.4 | 6.4 | |
| 65% Initial | 0.84 | 2.91 | 4.1 | 15.4 | 5.8 |
| Rest | 0.64 | 1.63 | 2.1 | 4.9 | 2.9 |

*Control.

TABLE II

Significance.—All of the foam compositions in Table II (Examples 6-12) are based on a 1500 molecular weight polyether resin (LHT-112). The control contains no aniline whereas the other examples contain 9.3 phr. (0.1 eq.) of aniline at various water levels and indices. All of the compositions containing aniline exhibit substantially higher load deflection values. Comparing Example 6 with Example 7, which were both run at the same water level and isocyanate index, it can be seen that the addition of 0.1 eq. of aniline more than tripled the load deflection values and reduced the percent rebound by 40%.

| | Example | | | | | | |
|---|---|---|---|---|---|---|---|
| | 6 | 7 | 8 | 9 | 10 | 11 | 12 |
| Resin, 1,500 M.W. polyether (LHT-112) | 100 | 100 | 100 | 100 | 100 | 100 | 100 |
| Surfactant (L-520) | 1.5 | 1.5 | 1.0 | 1.0 | 1.5 | 1.5 | 1.0 |
| Stannous octoate | .05 | .125 | .075 | .125 | .125 | .1 | .075 |
| N-ethylmorpholine | 1.5 | | | | | | |
| Triethylenediamine | 0.2 | | | | | | |
| Aniline | | 9.3 | 9.3 | 9.3 | 9.3 | 9.3 | 9.3 |
| Water | 3.5 | 3.5 | 3.5 | 3.5 | 4.0 | 3.0 | 2.0 |
| Toluene diisocyanate | 52.6 | 61.3 | 64.3 | 73.5 | 79.5 | 78.5 | 59.5 |
| Index | 100 | 100 | 105 | 120 | 120 | 140 | 130 |
| Density (p.c.f.) | 1.9 | 2.1 | 2.0 | 1.8 | 1.6 | 2.3 | 2.8 |
| Tensile (p.s.i.) | 21.8 | 20.0 | 24.4 | 24.6 | 27.9 | 40.4 | 31.8 |
| Tear (p.l.i.) | 2.3 | 2.1 | 2.9 | 2.4 | 1.8 | 3.8 | 2.8 |
| Percent rebound | 22 | 13 | | 24.5 | 24 | 30 | 19 |
| Load deflection (p.s.i.): | | | | | | | |
| 25% initial reading | 0.42 | 1.29 | 1.6 | 2.00 | 2.20 | 2.42 | 1.9 |
| 50% initial reading | 0.54 | 1.62 | 1.7 | 2.40 | 2.50 | 2.85 | 5.6 |
| 75% initial reading | 1.34 | 4.00 | 3.7 | 5.29 | 5.70 | 4.10 | 10.0 |
| Percent volume swell in gasoline | 35.1 | | 22.0 | 22.6 | | | |
| Percent volume swell in methanol | 61.4 | | 40.2 | 35.9 | | | |

TABLE III

Significance.—All of the foam compositions in Table III (Examples 13-18) are based on a 1500 molecular weight polyether resin (LHT-112). Examples 14-18 represent formulations comprising a primary aromatic amine having other functional group substituents bonded to the aromatic ring; none of said functional groups contained an active hydrogen atom as defined by the Zerewitinoff test. All of the foams illustrated in Table III were non-shrinking foams having high load deflection values and high tensile strengths. In addition to the foams produced in Examples 14-18, two other foams were produced from foamable polyurethane-forming compositions containing as the load-bearing agents therein m-aminobenzotrifluoride and o-nitroaniline; the two foams exhibited improved load-bearing properties similar to those of the foams produced in Examples 13–18.

compositions containing the heterocyclic compounds 3- and 4-aminopyridine were unsatisfactory because they were unstable and shrank. The composition containing aniline resulted in a foam with properties consistent with

|  | Example | | | | | |
|---|---|---|---|---|---|---|
|  | 13 | 14 | 15 | 16 | 17 | 18 |
| Resin, 1,500 M.W. polyether (LHT–112) | 100 | 100 | 100 | 100 | 100 | 100 |
| Surfactant (L–520) | 1.0 | 1.0 | 1.0 | 1.0 | 1.0 | 1.0 |
| Stannous octoate | .075 | .075 | .15 | .15 | .20 | .15 |
| Load-bearing agent | 9.3 (a) | 12.7 (b) | 12.7 (c) | 10.7 (d) | 10.7 (e) | 14.1 (f) |
| Water | 3.5 | 3.5 | 3.5 | 3.5 | 3.5 | 3.5 |
| Toluene diisocyanate | 79.5 | 79.5 | 79.5 | 79.5 | 79.5 | 79.5 |
| Index | 130 | 130 | 130 | 130 | 130 | 130 |
| Density (p.c.f.) | 2.32 | 2.12 | 2.01 | 2.12 | 2.00 | 2.01 |
| Tensile (p.s.i.) | 29.6 | 32.5 | 19.8 | 21.0 | 22.1 | 26.1 |
| Tear (p.l.i) | 2.8 | 3.5 | 1.4 | 2.1 | 1.5 | 1.4 |
| Load deflection (p.s.i.): | | | | | | |
| 25% initial reading | 2.10 | 2.3 | 2.2 | 1.9 | 2.5 | 2.3 |
| 50% initial reading | 2.28 | 2.7 | 2.7 | 2.3 | 3.0 | 2.6 |
| 65% initial reading | 3.10 | 3.8 | 4.0 | 3.6 | 4.3 | 3.8 |

In Examples 13–18, the symbols "a" to "f" represent respectively aniline (a), o-chloraniline (b), m-chloroaniline (c), o-toluidine (d), m-toluidine (e), and 3-chloro-2-methylaniline (f).

TABLE IV

Significance.—All of the foam compositions in Table IV (Examples 19–27) are based on a 1500 molecular weight polyester resin (LHT–112). All of these compositions contain an aromatic amino compound in order to evaluate the effects of primary, secondary and tertiary amino groups on foam properties. Only those compounds containing a primary aromatic amine were found to be effective in increasing foam stiffness (load deflection values). The foams containing secondary or tertiary amino groups were no stiffer than the control foam which had no amino compound in its composition. In the table, "a" represents aniline, "b" represents α-naphthalamine, "c" represents N-methylaniline, "d" represents N-ethylaniline, "e" represents N-butylaniline, "f" represents N-phenylaniline, "g" represents N-propylaniline and "h" represents N,N-dimethylaniline.

the above-mentioned improved embodiments of this invention.

|  | Example | |
|---|---|---|
|  | 30 | 31 |
| Resin, 1,500 M.W. polyether (LHT–112) | 100 | 100 |
| Surfactant (L–520) | 1.0 | 1.5 |
| Stannous octoate | 0.1 | 0.13 |
| Water | 3.0 | 3.0 |
| Amine: | | |
| Type | (¹) | (²) |
| Amount | 9.3 | 9.8 |
| Toluene diisocyanate | 61.6 | 61.6 |
| Index | 110 | 110 |
| Density (p.c.f.) | 2.44 | (³) |
| Tensile (p.s.i.) | 23.2 | (³) |
| Tear (p.l.i.) | 2.9 | (³) |
| Load Deflection (p.s.i.): | | |
| 25% initial reading | 1.40 |  |
| 50% initial reading | 1.63 |  |
| 65% initial reading | 2.83 |  |

¹ Aniline.
² Cyclohexylamine.
³ No foam produced—composition immediately solidified.

|  | Example | | | | | | | | |
|---|---|---|---|---|---|---|---|---|---|
|  | 19 | 20 | 21 | 22 | 23 | 24 | 25 | 26 | 27 |
| Resin, 1,500 M.W. polyether (LHT–112) | 100 | 100 | 100 | 100 | 100 | 100 | 100 | 100 | 100 |
| Surfactant (L–520) | 1.0 | 1.0 | 1.0 | 1.0 | 1.0 | 1.0 | 1.0 | 1.0 | 0.5 |
| Stannous octoate | 0.1 | 0.1 | 0.35 | 0.1 | 0.1 | 0.1 | 0.1 | 0.1 | 0.125 |
| Amino compound |  | 9.3 (a) | 14.3 (b) | 10.7 (c) | 12.1 (d) | 14.9 (e) | 16.9 (f) | 13.5(g) | 12.1 (h) |
| Water | 3.0 | 3.0 | 3.0 | 3.0 | 3.0 | 3.0 | 3.0 | 3.0 | 3.0 |
| Toluene diisocyanate | 52.1 | 61.6 | 61.6 | 61.6 | 61.6 | 61.6 | 61.6 | 61.6 | 52.1 |
| Index | 110 | 110 | 110 | 110 | 110 | 110 | 110 | 110 | 110 |
| Density (p.c.f.) | 2.18 | 2.44 | 2.38 | 2.48 | 2.43 | 2.78 | 2.29 | 2.11 | 2.74 |
| Tensile (p.s.i.) | 21.0 | 23.2 | 22.1 | 23.6 | 22.2 | 21.8 | 29.0 | 18.9 | 20.5 |
| Tear (p.l.i.) | 1.5 | 2.9 | 1.9 | 2.5 | 2.5 | 2.3 | 2.8 | 2.2 | 2.1 |
| Load deflection (p.s.i.): | | | | | | | | | |
| 20% initial reading | .92 | 1.40 | 1.01 | .68 | .60 | .60 | .82 | .53 | .75 |
| 50% initial reading | 1.08 | 1.63 | 1.40 | .84 | .72 | .67 | .93 | .60 | 1.01 |
| 65% initial reading | 1.62 | 2.83 | 2.43 | 1.37 | 1.15 | 1.10 | 1.40 | .93 | 1.65 |

TABLE V

Significance.—The comparative examples of Table V show the differences in properties of foams derived from compositions containing a compound having a primary amino group bonded directly to an aromatic ring carbon atom when compared to foams derived from compositions containing a compound having a primary amino group bonded directly to a heterocyclic ring carbon atom. Both foam compositions of Table V (Examples 30 and 31) were made with a 1500 molecular weight polyether resin (LHT–112). Example 30 contained 0.1 eq. aniline whereas Example 31 contained 0.1 eq. cyclohexylamine. The composition containing cyclohexylamine immediately solidified upon the addition of isocyanate producing a non-cellular polymerized mass. Foams produced from

TABLE VI

Significance.—All of the foam compositions in Table VI (Examples 32–35) are based on a 1500 molecular weight polyether resin (LHT–112). The compositions contain 0.1 eq. of aniline and 0.1 eq. each of the three isomers of phenylenediamine in four separate formulations. The three examples containing ortho-, meta- and para-phenylenediamine immediately solidified upon addition of the isocyanate producing non-cellular polymerized masses. The composition containing aniline produced a foam having properties consistent with the above-mentioned improved embodiments of this invention.

The presence of two amino groups on the same aromatic nucleus, regardless of their relative positions, causes increased catalytic reactivity resulting in instantaneous and uncontrollable urethane reactions.

|  | Example | | | |
|---|---|---|---|---|
|  | 32 | 33 | 34 | 35 |
| Resin, 1,500 M.W. polyether (LHT-112) | 100 | 100 | 100 | 100 |
| Surfactant (L-520) | 1.0 | 1.5 | 1.5 | 1.5 |
| Stannous octoate | 0.1 | 0.125 | 0.125 | 0.125 |
| Water | 3.0 | 3.0 | 3.0 | 3.0 |
| Amine: | | | | |
| Type | (1) | (2) | (3) | (4) |
| Amount | 9.3 | 5.4 | 5.4 | 5.4 |
| Toluene diisocyanate | 61.6 | 61.7 | 61.7 | 61.7 |
| Index | 110 | 110 | 110 | 110 |
| Density (p.c.f.) | 2.44 | (5) | (5) | (5) |
| Tensile (p.s.i.) | 23.2 | (5) | (5) | (5) |
| Tear (p.l.i.) | 2.9 | (5) | (5) | (5) |
| Load deflection (p.s.i.): | | | | |
| 25% initial reading | 1.40 | (5) | (5) | (5) |
| 50% initial reading | 1.63 | (5) | (5) | (5) |
| 65% initial reading | 2.83 | (5) | (5) | (5) |

1 Aniline.
2 O-phenylene diamine.
3 m-phenylene diamine.
4 p-phenylene diamine.
5 No foam produced—composition immediately solidified.

TABLE VII

Significance.—All of the foam compositions in Table VII (Examples 36–39) are based on a 1500 molecular weight polyether resin (LHT–112). The addition of aniline (0.1 eq.) to both polymeric polyisocyanate based compositions substantially increased tensile strength and load deflection values, especially load deflection. In the table, "a" represents methylene bis (4-phenylisocyanate) and "b" represents polymethylene polyphenylisocyanate.

|  | EXAMPLE | | | |
|---|---|---|---|---|
|  | 36 | 37 | 38 | 39 |
| Resin, 1,500 M.W. polyether (LTH-112) | 100 | 100 | 100 | 100 |
| Surfactant (L-520) | 1.0 | 1.0 | 1.0 | 1.0 |
| Stannous octoate | .025 | 0.1 | 0.2 | 0.1 |
| NEM | 4.0 |  | 3.0 |  |
| Triethylenediamine |  |  | 0.1 | .033 |
| Aniline |  | 9.3 |  | 9.3 |
| Water | 3.5 | 3.5 | 3.5 | 3.5 |
| Isocyanate | 78.7 (a) | 101 (a) | 96.6 (b) | 112.5 (b) |
| Index | 95 | 105 | 120 | 120 |
| Density (p.c.f.) | 2.1 | 2.9 | 2.54 | 2.45 |
| Tensile (p.s.i.) | 13.9 | 31.5 | 15.8 | 28.7 |
| Tear (p.l.i.) | .72 |  | .91 | .93 |
| Percent Compression deflection: | | | | |
| 25% Inst | 1.45 | 5.1 | 1.93 | 6.10 |
| 50% Inst | 1.81 | 7.5 | 3.00 | 8.33 |
| 65% Inst | 2.62 | 13.2 | 5.35 | 13.78 |

TABLE VIII

Significance.—Foams derived from compositions containing another reactive ring substituent in addition to a primary amino group exhibited the above-mentioned improved embodiments of this invention.

|  | Example | | | |
|---|---|---|---|---|
|  | 40 | 41 | 42 | 43 |
| Resin, 1,500 M.W. polyether (LHT-112) | 100 | 100 | 100 | 100 |
| m-Aminophenol |  | 5.5 |  |  |
| m-Aminobenzoic acid |  |  | 6.9 |  |
| 4-aminosalicylic acid |  |  |  | 5.0 |
| Aniline | 9.3 |  |  |  |
| L-540 | 1.0 | 1.0 | 1.0 | 1.0 |
| C-6 | .6 | .15 | 1.2 | 1.8 |
| Water | 3.0 | 3.0 | 3.0 | 3.0 |
| Toluene diisocyanate | 67.3 | 67.3 | 67.3 | 67.3 |
| Index | 120 | 120 | 120 | 120 |
| Density (p.c.f.) | 2.2 | 2.5 | 2.1 | 2.2 |
| Tensile (p.s.i.) | 29.5 | 17.2 | 24.4 | 29.0 |
| Tear (p.l.i.) | 2.4 | 2.3 | 2.0 | 2.4 |
| Load deflection: | | | | |
| 25% Initial | 2.2 | 2.3 | 2.0 | 2.0 |
| Rest | 1.4 | 1.1 | 1.0 | 1.0 |
| 50% Initial | 2.8 | 3.1 | 2.5 | 2.4 |
| Rest | 1.8 | 1.5 | 1.4 | 1.2 |
| 65% Initial | 4.1 | 5.3 | 9.0 | 3.8 |
| Rest | 2.6 | 2.5 | 2.2 | 1.9 |

TABLE IX

Significance.—All of the foam compositions in Table IX (Examples 44–47) are based on a 3000 molecular weight polyether resin (ET3000). The controls contain no aniline whereas the other examples contain 9.3 phr. aniline (0.1 eq.). The compositions containing aniline exhibit substantially higher load deflection value and substantially lower percent rebound values and percent solvent swell values. The addition of aniline reduced the resilience (as measured by percent rebound) of a normally "rubbery" foam by as much as 50–55%, while percent volume swells in gasoline and methanol were lowered by 52% and 38% respectively.

|  | Example | | | |
|---|---|---|---|---|
|  | 44* | 45 | 46* | 47 |
| Resin, 3,000 M.W. polyether (ET 3000) | 100 | 100 | 100 | 100 |
| Surfactant (L-520) | 1.5 | 1.5 | 1.5 | 1.5 |
| Stannous octoate | 0.25 | 0.35 | 0.25 | 0.35 |
| N-ethylmorpholine | 1.0 |  | 1.0 |  |
| Triethylenediamine | 0.2 |  | 0.2 |  |
| Aniline |  | 9.3 |  | 9.3 |
| Water | 4.0 | 4.0 | 3.0 | 3.0 |
| Toluene diisocyanate | 58.5 | 69.0 | 46.5 | 57.0 |
| Index | 120 | 120 | 120 | 120 |
| Density (p.c.f.) | 1.5 | 1.6 | 1.9 | 1.9 |
| Tensile (p.s.i.) | 19.2 | 20.3 | 15.1 | 12.8 |
| Tear (p.l.i.) | 1.5 | 2.0 | 1.8 | 1.9 |
| Percent rebound | 47 | 23.5 | 56 | 26 |
| Load Deflection (p.s.i.): | | | | |
| 25% initial | 0.74 | 1.39 | 0.57 | 1.05 |
| 50% initial | 0.86 | 1.70 | 0.74 | 1.26 |
| 75% initial | 1.81 | 3.63 | 2.06 | 3.01 |
| Percent volume swell in gasoline |  | 28.8 | 59.9 |  |
| Percent volume swell in methanol |  | 38.7 | 60.7 |  |

*Control.

TABLE X

Significance.—All of the foam compositions in Table X (Examples 48–50) were made with a 3000 molecular weight polyester resin (Fomrez 50). The control contains no aniline whereas the other two examples contain 4.65 and 7.0 phr. aniline. The improvements in tensile, tear and load-bearing must be related to density to be appreciated. These properties of the control formulation and the inventive formulations are quite close, but the inventive formulations are able to obtain their properties at much lower densities—23 to 32% less dense than the control.

|  | Example | | |
|---|---|---|---|
|  | 48* | 49 | 50 |
| Polyester resin (Fomrez-50) | 100 | 100 | 100 |
| Surfactant (L-532) | 1.0 | 1.0 | 1.0 |
| Stannous octoate |  | 0.4 | 0.3 |
| N-ethylmorpholine | 2.0 |  |  |
| Aniline |  | 4.65 | 7.0 |
| Water | 3.5 | 3.5 | 3.5 |
| Toluene diisocyanate | 45.9 | 50.4 | 52.7 |
| Index | 105 | 105 | 105 |
| Density (p.c.f.) | 2.2 | 1.7 | 1.5 |
| Tensile (p.s.i.) | 17.5 | 18.0 | 28.5 |
| Tear (p.l.i.) | 2.4 | 4.5 | 4.0 |
| Load deflection (p.s.i.): | | | |
| 25%—Initial | 1.3 | 1.4 | 1.4 |
| Rest | 0.95 | 0.93 | 0.91 |
| 50%—Initial | 1.7 | 1.7 | 1.6 |
| Rest | 1.3 | 1.1 | 1.1 |
| 65%—Initial | 2.6 | 2.0 | 2.1 |
| Rest | 1.9 | 1.3 | 1.4 |

*Control.

From the foregoing Examples it will be appreciated that the process of this invention produced products having improved properties of load-bearing, recovery rate, tensile strength, tear strength and resistance to solvent swell.

It will be recognized that the foregoing Examples are intended to be illustrative and not restrictive in nature, and may be departed from without departing from the spirit and scope of this invention. This is particularly true in the polyurethane foam art, wherein a plethora of variations of the relative amounts and identities of ingredients of foam formulations can conventionally be made, to vary the specific properties or combinations of properties of a particular type of foam product.

What is claimed is:

1. A flexible polyurethane foam having improved load-bearing properties derived from a foamable polyurethane-forming reaction mixture comprising as a load-bearing agent contained therein a compound having the following formula $$R_n[A]NH_2,$$

wherein A is a member selected from the group consisting of

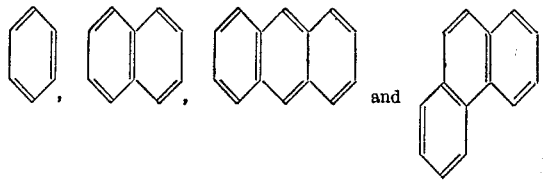 and where $n$ is a zero or an integer of from 1 to 5; $R_n$ is selected from the group consisting of $C_1$–$C_8$ alkyl, phenyl, halogen, mercapto, nitro, $C_1$–$C_8$ alkoxy, phenylalkyl wherein the alkyl portion contains from 1 to 3 carbon atoms, $C_1$–$C_3$ haloalkyl, and $C_1$–$C_3$ nitroalkyl provided that when R is alkoxy or alkyl and is ortho- to the amino group, then no other alkoxy or alkyl group may be ortho- or para- to said amino group wherein, said load-bearing agent is present in the foamable polyurethane-forming reaction mixture in an amount of from 0.05 mole to 0.2 mole per 100 parts of polyol.

2. A polyurethane foa as defined in claim 1 wherein the load-bearing agent is a primary aromatic amine of the formula

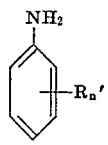

wherein R is selected from the group consisting of $C_1$–$C_8$ alkyl, phenyl, halogen, mercapto, nitro, phenylalkyl wherein the alkyl portion contains from 1 to 3 carbon atoms, $C_1$–$C_3$ haloalkyl, and $C_1$–$C_3$ nitroalkyl; provided that when R is alkoxy or alkyl and is ortho- to the amino group, then no other alkoxy or alkyl group may be ortho- or para- to said amino group, and $n$ is zero or an integer of from 1 to 3.

3. A polyurethane foam as defined in claim 2, wherein the primary aromatic amine is aniline.

4. A polyurethane foam as defined in claim 2, wherein the primary aromatic amine is o-chloroaniline.

5. A process for producing a flexible polyurethane foam having improved load-bearing properties comprising reacting a polyisocyanate and a polyhydroxy-containing compound in the presence of a catalyst, a blowing agent and the load-bearing agent of claim 1.

6. A process for producing a flexible polyurethane foam having improved load-bearing properties comprising reacting a polyisocyanate and a polyhydroxy-containing compound in the presence of a catalyst, a blowing agent and the load-bearing agent of claim 2.

7. A process as defined in claim 6, wherein the load-bearing agent is aniline.

8. A process as defined in claim 6, wherein the load-bearing agent is o-chloroaniline.

9. A process as defined in claim 6, wherein the index of the polyisocyanate is in the range from about 90 to about 140.

10. A process as defined in claim 6, wherein the index of the polyisocyanate is in the range from about 105 to about 140.

11. A polyurethane foam as defined in claim 1 wherein the load-bearing agent is selected from the group consisting of aniline, o-chloroaniline, m-chloroaniline, p-chloroaniline, o-toluidine, p-toluidine, m-toluidine, 3-chloro-2-methylaniline, 5-chloro-2-methylaniline, 2-chloro-3-methylaniline, 2-chloro-5-methylaniline, α-naphthylamine, β-naphthylamine, 2,5-dichloroaniline, 3,4-dichloroaniline, o-ethylaniline, m-ethylaniline, p-ethylaniline, o-nitroaniline, m-nitroaniline, p-nitroaniline, m-(trifluoromethyl)aniline, o-(trifluoromethyl)aniline, p-(trifluoromethyl)aniline, o-aminobenzonitrile, ortho-anisidine, m-anisidine and p-anisidine.

12. A process as defined in claim 5 wherein the load-bearing agent is selected from the group consisting of aniline, o-chloroaniline, m-chloroaniline, p-chloroaniline, o-toluidine, p-toluidine, m-toluidine, 3-chloro-2-methylaniline, 5-chloro-2-methylaniline, 2-chloro-3-methylaniline, 2-chloro-5-methylaniline, α - naphthylamine, β - naphthylamine, 2,5-dichloroaniline, 3,4-dichloroaniline, o-ethylaniline, m-ethylaniline, p-ethylaniline, o-nitroaniline, m-nitroaniline, p-nitroaniline, m-(trifluoromethyl)aniline, o-(trifluoromethyl)aniline, p - (trifluoromethyl)aniline, o-aminobenzonitrile, ortho-anisidine, m-anisidine, and p-anisidine.

References Cited

UNITED STATES PATENTS

| | | | |
|---|---|---|---|
| 3,738,947 | 6/1973 | Fishbein et al. | 260—2.5 AM |
| 3,523,918 | 8/1970 | Gonzalez | 260—2.5 AZ |
| 3,336,242 | 8/1967 | Hampson | 260—2.5 AP |
| 3,284,376 | 11/1966 | Pedjac | 260—2.5 AJ |

FOREIGN PATENTS

| | | |
|---|---|---|
| 1,031,508 | 6/1958 | Germany. |

DONALD E. CZAJA, Primary Examiner

C. W. IVY, Assistant Examiner

U.S. Cl. X.R.

260—2.5 AP, 2.5 AN

UNITED STATES PATENT OFFICE
CERTIFICATE OF CORRECTION

Patent No. 3,826,763                    Dated July 30, 1974

Inventor(s) Roland J. Lamplugh et al.

It is certified that error appears in the above-identified patent and that said Letters Patent are hereby corrected as shown below:

Column 3, line 36, insert --,-- after "ortho-".
Column 6, line 25, change "abolity" to --ability--.
Column 7, line 64, delete the first "(".
Column 8, line 35, change "substantally" to --substantially--.
Column 9, line 27, change "polyester" to --polyether--.
Column 9 & 10, Table IV, line 8, change "2.18" to --2.28--.
Column 9 & 10, Table IV, line 12, change "20%" to --25%--.
Column 11, Table VII, line 2, change "(LTH-112)" to --(LHT-112)--.
Column 12, Table IX, line 22, change "38.7" to --37.8--.
Column 13, line 30, change "foa" to --foam--.
Column 13, line 24, insert --,-- after "ortho-".
Column 13, line 44, insert --,-- after "ortho-".

Signed and Sealed this

Twenty-eighth Day of December 1976

[SEAL]

Attest:

RUTH C. MASON  
Attesting Officer

C. MARSHALL DANN  
Commissioner of Patents and Trademarks